US011520984B2

(12) United States Patent
Clements et al.

(10) Patent No.: US 11,520,984 B2
(45) Date of Patent: Dec. 6, 2022

(54) SYSTEM AND METHOD FOR GENERATING PREDICTIONS

(71) Applicant: MICROSOFT TECHNOLOGY LICENSING, LLC, Redmond, WA (US)

(72) Inventors: Adam Clements, Hebden Bridge (GB); Matthew James Willson, London (GB); Douglas Orr, Brentwood (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 17/074,133

(22) Filed: Oct. 19, 2020

(65) Prior Publication Data

US 2021/0133395 A1 May 6, 2021

Related U.S. Application Data

(63) Continuation of application No. 16/076,995, filed as application No. PCT/GB2017/050200 on Jan. 26, 2017, now Pat. No. 10,810,370.

(30) Foreign Application Priority Data

Feb. 9, 2016 (GB) ...................................... 1602308

(51) Int. Cl.
| | |
|---|---|
| *G06F 40/274* | (2020.01) |
| *G06Q 10/10* | (2012.01) |
| *G06F 3/04886* | (2022.01) |
| *G06F 9/54* | (2006.01) |
| *G06N 3/08* | (2006.01) |
| *G06N 7/00* | (2006.01) |

(52) U.S. Cl.
CPC ........ *G06F 40/274* (2020.01); *G06F 3/04886* (2013.01); *G06F 9/54* (2013.01); *G06N 3/084* (2013.01); *G06N 7/005* (2013.01); *G06Q 10/10* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 8,078,978 | B2 * | 12/2011 | Perry .................... | G06F 40/166 715/752 |
| 8,756,052 | B2 * | 6/2014 | Walker .................. | G06F 40/274 709/224 |

(Continued)

FOREIGN PATENT DOCUMENTS

| | | |
|---|---|---|
| CN | 1582010 A | 2/2005 |
| CN | 1658188 A | 8/2005 |

(Continued)

OTHER PUBLICATIONS

"Office Action Issued in Indian Patent Application No. 201817028992", dated May 31, 2021, 6 Pages.

(Continued)

*Primary Examiner* — Marcus T Riley
(74) *Attorney, Agent, or Firm* — Chin IP, PLLC

(57) ABSTRACT

There is provided a system and method for generating predictions. The predictions are generated using a model configured to associate text with at least one action associated with at least one of a plurality of applications.

20 Claims, 7 Drawing Sheets

(56) References Cited

U.S. PATENT DOCUMENTS

| | | | | |
|---|---|---|---|---|
| 8,819,574 B2* | 8/2014 | Ouyang | ................ | G06F 3/0237 715/773 |
| 8,849,730 B2* | 9/2014 | Winn | .................... | G06Q 10/10 706/20 |
| 9,303,997 B2* | 4/2016 | McGavran | ............. | G06N 20/00 |
| 9,558,452 B2* | 1/2017 | Guiver | ................ | G06Q 10/107 |
| 9,630,090 B2* | 4/2017 | Myslinski | ............... | G06F 40/40 |
| 9,632,502 B1* | 4/2017 | Levinson | ............ | H04L 41/0816 |
| 10,810,370 B2* | 10/2020 | Clements | ................. | G06F 9/54 |
| 2013/0159220 A1* | 6/2013 | Winn | .................... | G06F 16/337 706/12 |
| 2013/0159408 A1* | 6/2013 | Winn | .................... | G06N 20/00 709/204 |
| 2013/0289976 A1* | 10/2013 | Walker | ................. | G06F 40/274 704/9 |
| 2014/0188461 A1* | 7/2014 | Myslinski | ............... | A63F 13/00 704/9 |
| 2014/0257797 A1* | 9/2014 | Walker | ................. | G06F 40/274 704/9 |
| 2014/0278051 A1* | 9/2014 | McGavran | ......... | G01C 21/3492 706/45 |
| 2014/0316769 A1* | 10/2014 | Myslinski | ............... | G06F 16/95 704/9 |
| 2015/0134304 A1* | 5/2015 | Guiver | .................. | G06N 7/005 703/2 |
| 2017/0123419 A1* | 5/2017 | Levinson | ............ | H04L 41/0816 |
| 2019/0050392 A1* | 2/2019 | Clements | ............... | G06Q 10/10 |
| 2021/0133395 A1* | 5/2021 | Clements | ............ | G06F 3/04886 |

FOREIGN PATENT DOCUMENTS

| | | |
|---|---|---|
| CN | 102685031 A | 9/2012 |
| CN | 103077224 A | 5/2013 |

OTHER PUBLICATIONS

"First Office Action and Search Report Issued in Chinese Patent Application No. 201780010545.2", dated Aug. 4, 2021, 12 Pages.
"Office Action Issued in Chinese Patent Application No. 201780010545.2", dated May 17, 2022, 13 Pages.

* cited by examiner

Initial Counts

| Features/words | Applications | | |
|---|---|---|---|
| | Google Maps | Google Calendar | YouTube |
| Where | 5 | 1 | 1 |
| Play | 1 | 4 | 4 |
| When | 1 | 8 | 1 |

Initial Scores

| Features/words | Applications | | |
|---|---|---|---|
| | Google Maps | Google Calendar | YouTube |
| Where | 5/7 | 1/7 | 1/7 |
| Play | 1/9 | 4/9 | 4/9 |
| When | 1/10 | 4/5 | 1/10 |

Counts After First Use

| Features/words | Applications | | |
|---|---|---|---|
| | Google Maps | Google Calendar | YouTube |
| Where | 6 | 1 | 1 |
| Play | 1 | 4 | 4 |
| When | 1 | 8 | 1 |

Scores After First Use

| Features/words | Applications | | |
|---|---|---|---|
| | Google Maps | Google Calendar | YouTube |
| Where | 3/4 | 1/8 | 1/8 |
| Play | 1/9 | 4/9 | 4/9 |
| When | 1/10 | 4/5 | 1/10 |

Counts After Multiple Uses

| Features/words | Applications | | |
|---|---|---|---|
| | Google Maps | Google Calendar | YouTube |
| Where | 8 | 3 | 1 |
| Play | 1 | 4 | 6 |
| When | 3 | 10 | 1 |

Scores After Multiple Uses

| Features/words | Applications | | |
|---|---|---|---|
| | Google Maps | Google Calendar | YouTube |
| Where | 2/3 | 1/4 | 1/12 |
| Play | 1/11 | 4/11 | 6/11 |
| When | 3/14 | 5/7 | 1/14 |

FIG. 4

Application Counts

|  | Subway | Michelin | YouTube | Total |
|---|---|---|---|---|
| Count | 15 | 10 | 5 | 30 |

Application Word Counts

| Words | Subway | Michelin | YouTube |
|---|---|---|---|
| Meal | 5 | 5 | 1 |

Application Time Counts

| Time | Subway | Michelin | YouTube |
|---|---|---|---|
| <15:00 | 4 | 1 | 1 |
| >19:00 | 1 | 4 | 0 |

Unnormalized Probabilities

| Words+Time | Subway | Michelin | YouTube |
|---|---|---|---|
| Meal<15:00 | 0.044 | 0.017 | 0.007 |
| Meal>19:00 | 0.011 | 0.067 | 0.000 |

Normalized Probabilities

| Words+Time | Subway | Michelin | YouTube |
|---|---|---|---|
| Meal<15:00 | 66% | 25% | 10% |
| Meal>19:00 | 14% | 86% | 0% |

FIG. 5A

Application Counts

|  | Subway | Michelin | YouTube | Total |
|---|---|---|---|---|
| Count | 15 | 10 | 5 | 30 |

Application Word-Times Counts

| Time | Subway | Michelin | YouTube |
|---|---|---|---|
| <15:00 | 4 | 1 | 1 |
| >19:00 | 1 | 4 | 0 |

Unnormalized Probabilities

| Words+Time | Subway | Michelin | YouTube |
|---|---|---|---|
| Meal<15:00 | 0.133 | 0.033 | 0.033 |
| Meal>19:00 | 0.033 | 0.133 | 0.000 |

Normalized Probabilities

| Words+Time | Subway | Michelin | YouTube |
|---|---|---|---|
| Meal<15:00 | 67% | 17% | 17% |
| Meal>19:00 | 20% | 80% | 0% |

FIG. 5B

SYSTEM AND METHOD FOR GENERATING PREDICTIONS

CROSS-REFERENCE TO RELATED APPLICATIONS

This application is a continuation of U.S. application Ser. No. 16/076,995, filed Aug. 9, 2018, and issued as U.S. Pat. No. 10,810,370, which was the National Stage of International Application No. PCT/GB2017/050200, filed Jan. 26, 2017, which claims priority to British Patent Application No. 1602308.7, filed Feb. 9, 2016, which applications are hereby incorporated by reference. To the extent appropriate, a claim of priority is made to each of the above disclosed applications.

FIELD OF THE INVENTION

The present invention relates generally to a system and method for generating predictions of actions associated with applications.

BACKGROUND

Computing devices are commonly installed with many software applications (or 'apps'). When using a computing device, it is often necessary for a user to switch between applications. For example, when using a messaging application, a user may wish to switch to a mapping application, calendar application, or web browser application displaying public transport timetable information. This will generally require the user to close or minimise the first application, locate the second application within the computing device's application launcher interface, and select the desired application to open or maximise it. This can result in user frustration at the amount of time taken to switch between applications, particularly in the situation where a very large number of applications are installed on a device.

It is an object of the invention to overcome this and other problems.

SUMMARY OF THE INVENTION

In a first aspect of the invention, a system is provided, the system comprising: a model configured to associate text with at least one action associated with at least one of a plurality of applications; a model updater configured to monitor text within a first application of the plurality of applications, monitor an action associated with a second application of the plurality of applications, and update the model to associate at least a part of the text within the first application with the action associated with the second application; and a predictor configured to generate a prediction of at least one action for at least one application of the plurality of applications using the model, based on at least a part of the text within the first application.

The text within the first application may be text displayed in the first application, text received by the first application and/or text input by a user into the first application.

The text used to update the model may be different to the text on which the prediction is based.

The model may be further configured to associate text with application categories; the model updater may be further configured to update the model to associate the at least part of the text within the first application with the application category of the second application; and the predictor may be further configured to generate the prediction based on application categories.

The action associated with the second application may include opening or maximising the second application, or switching from the first application to the second application, optionally wherein the action associated with the second application further includes performing an internal action in the second application or opening a specific view in the second application.

The model updater may be configured to monitor the text within the first application in response to an action associated with the first application, optionally wherein the action is closing or minimising the first application, or performing an internal action in the first application or opening a specific view within the first application.

The model updater may be configured to update the model in response to an action associated with the second application, optionally wherein the action is opening or maximising the second application, or switching from the first application to the second application.

The system may further comprise a universal keyboard which is displayed at the same time as the first application and at the same time as the second application.

The model updater may be configured to monitor the text within the first application by monitoring text input by a user into the first application using the universal keyboard.

The model updater may be configured to monitor the action associated with the second application through the universal keyboard.

The predictor may be configured to present the prediction to a user for selection.

The predictor may be configured to present the prediction to the user in response to a prediction display trigger.

The prediction display trigger may comprise text within the first application which is different to the part of the text on which the prediction is based or which is the same as the part of the text on which the prediction is based.

The prediction display trigger may comprise at least one of: an action associated with the first application, optionally wherein the action is closing or minimising the first application; or an application program interface request from one of the plurality of applications which is not the first application.

The predictor may be further configured to generate the prediction based on a time delay between the occurrence of the prediction display trigger and the occurrence of the part of the text on which the prediction is based.

The predictor may be configured to present the prediction to the user on the universal keyboard.

The model updater may be configured to monitor the action associated with the second application through a user selection of the prediction presented on the universal keyboard.

The predictor may be configured to present the prediction to the user through any one of: a user interface element on a home screen of the system; a notification or alert of the system; a digital personal assistant; and/or a user interface element within the first application.

The model may be configured to associate contextual data with the one or more actions associated with the plurality of applications; the model updater may be configured to update the model to associate contextual data with the action associated with the second application; and the predictor may be further configured to generate the prediction based on contextual data.

The contextual data may be selected from: active application data; data derived from text displayed in the first application; time data and/or location data.

The model may comprise a Bayesian model or a neural network.

The prediction of at least one action generated by the predictor may comprise an action of installing an application, optionally the action of installing an application may comprise recommending an application to be installed, or opening a view within an application store providing more information about an application.

In a further aspect of the invention, a method is provided, the method comprising: monitoring text within a first application of a plurality of applications; monitoring an action associated with a second application of the plurality of applications; updating a model to associate at least a part of the text within the first application with the action associated with the second application, wherein the model is configured to associate text with one or more actions associated with at least one of the plurality of applications; and generating a prediction of at least one action for at least one application of the plurality of applications using the model, based on at least a part of the text within the first application.

The step of monitoring text within a first application may comprise monitoring text displayed in the first application, text received by the first application and/or text input by a user into the first application.

The text used in the step of updating the model may be different to the text on which the prediction is based in the step of generating a predication.

The action associated with the second application may include opening or maximising the second application, or switching from the first application to the second application, optionally wherein the action associated with the second application further includes performing an internal action in the second application or opening a specific view in the second application.

The text may be monitored within the first application in response to an action associated with the first application, optionally wherein the action is closing or minimising the first application, or performing an internal action in the first application or opening a specific view within the first application.

The model may be updated in response to an action associated with the second application, optionally wherein the action is opening or maximising the second application, or switching from the first application to the second application.

The method may further comprise a step of displaying a universal keyboard in the second application.

The action associated with the second application may be monitored through the universal keyboard.

The method may further comprise the step of presenting the prediction to a user for selection.

The presentation of the prediction to the user may be in response to a prediction display trigger.

The prediction display trigger may comprise text within the first application which is different to the part of the text on which the prediction is based or which is the same as the part of the text on which the prediction is based.

The prediction display trigger may comprise at least one of: an action associated with the first application, optionally wherein the action is closing or minimising the first application; or an application program interface request from one of the plurality of applications which is not the first application.

The prediction may be further based on a time delay between the occurrence of the prediction display trigger and the occurrence of the part of the text on which the prediction is based.

The prediction may be presented to the user on the universal keyboard.

The action associated with the second application may be monitored through a user selection of the prediction presented on the universal keyboard.

The prediction may be presented to the user through any one of: a user interface element on a home screen of the system; a notification or alert of the system; a digital personal assistant; and/or a user interface element within the first application.

The model may be configured to associate contextual data with the one or more actions associated with the plurality of applications and the step of updating the model may further comprise updating the model to associate contextual data with the action associated with the second application; and the prediction may be generated further based on contextual data.

The contextual data may be selected from: active application data; data derived from text displayed in the first application; time data and/or location data.

The model may comprise a Bayesian model or a neural network.

The at least one action which is predicted may comprise an action of installing an application.

In a further aspect of the invention, a computer-readable medium is provided, the computer-readable medium containing program instructions, wherein execution of the program instructions by one or more processors of a computer system causes the one or more processors to: monitor text within a first application of a plurality of applications; monitor an action associated with a second application of the plurality of applications; update a model to associate at least a part of the text within the first application with the action associated with the second application, wherein the model is configured to associate text with one or more actions associated with at least one of the plurality of applications; and generate a prediction of at least one action for at least one application of the plurality of applications using the model, based on at least a part of the text within the first application In a further aspect of the invention, an electronic device is provided, the electronic device comprising: a model configured to associate text with at least one action associated with at least one of a plurality of applications; a model updater configured to monitor text within a first application of the plurality of applications; monitor an action associated with a second application of the plurality of applications; and update the model to associate at least a part of the text within the first application with the action associated with the second application; and a predictor configured to generate a prediction of at least one action for at least one application of the plurality of applications using the model, based on at least a part of the text within the first application; and a user interface which is configured to display for selection the prediction of at least one action generated by the predictor.

BRIEF DESCRIPTION OF THE DRAWINGS

FIG. 4 shows data used to train an exemplary naïve Bayes classifier based model.

FIGS. 5A and 5B show example calculations performed to generate predictions of application actions based on text and contextual data.

DETAILED DESCRIPTION

The present invention is directed towards systems and methods for generating predictions of contextually relevant application actions based on the text within a first application.

As will be described in more detail below, relevant application actions might include the opening or maximising of a second application, opening a specific view or performing a particular internal action within the first application or another application. Text within the first application may be text which is displayed on the screen of the application (for example, which has been captured via a screen reading application program interface of the operating system), text which is received by the application (for example a message), text displayed in a notification or overlay displayed at the same time as the first application, or may be text which is input by the user into the first application.

This is advantageous in computing devices having multiple applications. Depending on the text within the first application, a prediction can be provided to a user of an application action which may be contextually relevant. For example, if the text "Would you like to get dinner?" is displayed within a first application which is a messaging application, the system may predict that the user is likely to switch to a restaurant booking application, or to a restaurant review webpage in a web browser application.

The system might present the predicted actions of switching to the restaurant booking application or switching to the browser application and opening the restaurant review webpage in a user interface of the device. The user can then select one of the predicted actions from within the first messaging application, without having to return to the system application launcher of the device.

The predictions are generated by means of a model, which is updated by a model updater configured to associate text within with particular application actions. In this way, the system can dynamically learn over time what application actions a user is likely to carry out in response to particular text, and thus generate more accurate predictions.

This can advantageously reduce the time spent by the user switching between applications. Moreover, since the system is dynamic, it can refine, overtime, the predicted relevance of particular application actions in response to particular text terms. Moreover, if a new application is installed, or the user tends toward particular idiosyncratic language, then the system will still be able to, over time, generate associations with relevant applications and present appropriate predictions of application actions to the user.

Figure 1:
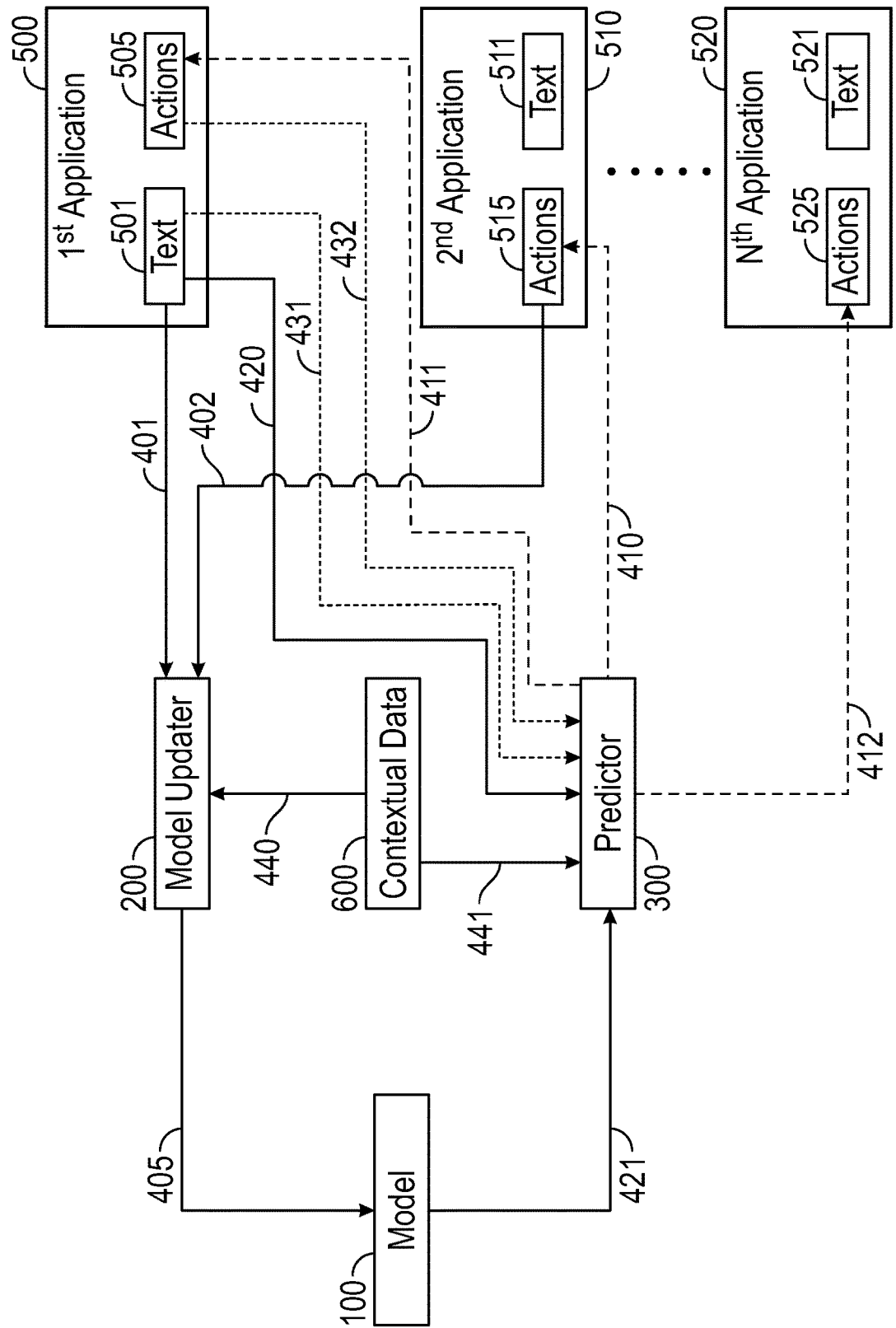
FIG. 1 is a schematic of a system according to the present invention.

A system for generating predictions according to the present invention can be implemented as shown as a block diagram in FIG. 1. The system will also be described with reference to the specific exemplary implementation illustrated in FIGS. 2A to 2B.

The system comprises a model 100, a model updater 200 and a predictor 300. The system is configured to interact with a plurality of applications. For example, as shown, the plurality of applications may comprise a first application 500, a second application 510, and so on up to the nth application 520.

The model 100 is configured to associate text with at least one action associated with at least one of the plurality of applications.

As indicated by arrow 401, the model updater 200 is configured to monitor text 501 within a first application 500 of the plurality of applications. In some embodiments, the text 501 which is monitored within the first application may be filtered before being used by the model updater 200 to update the model 100 and/or by the predictor 300 to generate a prediction (as will be described further below). The filtering may remove, for example, punctuation, numbers or other particular characters, or filter out particular words or sequences of words. By way of further example, the filtering may be used to remove sections of text which have already recently been used by the model updater 200 to update the model 100, as described in United Kingdom Patent Application No. 1510318.7, titled "System and method for generating text predictions", in relation to text block filters configured to filter blocks of text which have already been used by a model updater to update a model, which disclosure is herein incorporated by reference. United Kingdom Patent Application No. 1510318.7 is herein incorporated by reference in its entirety.

As indicated by arrow 402, the model updater is further configured to monitor an action 515 associated with a second application 515. As indicated by arrow 405, the model updater is further configured to update the model so as to associate at least part of the text 501 which has been monitored within the first application 500 with the action 515 which is associated with the second application 510.

By updating the model to associate the part of the text with the action, it is meant that if no such association already exists within the model between the at least part of the text and the action, then the model updater updates the model such that an association exists, or if the association already exists, then the model updater might update the model such that the part of the text and the action are further associated, in that the association is strengthened. The model updater may update the model multiple times for the same part of text, for example to associate a particular sequence of words or phrase with an action, and to associate a single word from within that phrase with the action, or to associate the text with the action, and to associate context data with the action.

The predictor 300 is configured to generate a predication of at least one action for at least one application of the plurality of applications. For example, as indicated by arrow 410, the predictor might predict an action 515 associated with a second application 510. For example, the predictor may predict the action of opening or maximising the second application. The predictor might alternatively or additionally predict an action 505 associated with the first application, and/or an action 525 associated with a further application 520 of the plurality of applications.

As indicated by arrows 420 and 421, the predictor 300 is configured to generate a prediction based on at least part of the text 501 in the first application 500 and the model 100. For example, a particular term or sequence of terms in the text 501 of the first application may be associated, through the model 100, with a particular action associated with one of the plurality of applications, and thus the predictor 300 might, based on model 100, generate a prediction of that action.

The model 100 might additionally associate text with an application category. The model updater 200 might be configured to update the model 100 to associate text 501 with the application category of the second application 510. For example, the model 100 might be updated to associate particular text with the action of opening a second application of a particular category, for example, navigation applications. When the predictor 300 generates a predication based on the model and a particular text term, it may then generate a prediction of an action of opening an application which is in the category of navigation applications. When the predictor 300 presents the predictions to the user, it may present one or more applications from that application category. In this way, if the model 100 associates particular text with a category of applications, and the user installs a new application within that category (in this example, a new navigation application), the predictor will be able to present an action associated with the newly installed application based on that text, through the application category, without the model updater having to update the model on the basis of the user performing an action associated with the newly installed application. The application categories may be static, that is to say, each application of the plurality of applications may be statically associated with one or more category. Additionally or alternatively, the categories could be dynamic, in that the model might, over time, be updated to group particular applications into categories.

Of course, the part of the text which is used by the model updater 200 to update the model 100 might be different from the part of the text which is used by the predictor 300 to generate the prediction. Also, the model updater 200 need not constantly update the model 100, nor the predictor 300 constantly generate predictions. The model updater 200 and predictor 300 may operate contemporaneously (i.e. the model updater 200 update the model at the same time as the predictor 300 generating predictions), or they may operate at different times.

That is to say, the model updater 200 may monitor the text 511 within the first application 500 and later use a first part of the text 511 (e.g. a first text term or sequence of text terms) to update the model 100, associating the first part of the text with a monitored action 515 of a second application 510 (for example, opening said second application). The predictor 300 might simultaneously use a second part of the text 511 (e.g. a second text term or sequence of terms) to generate a prediction of an action, based on an association between said second part of the text and an action.

Of course, this action may be an action 515 associated with the second application 510 (e.g., opening said second application), or may be an action 525 associated with another application 520 of the plurality of applications, or indeed an action 505 associated with the first application, for example opening a particular view within the first application 500, or performing a particular command within the first application 500.

Where the action predicted by the predictor 300 is an action associated with a second application 510 of the plurality of applications, the action might also include performing an internal action 515 within said second application 510. For example, the predictor 300 might generate a prediction of opening said second application 510 and then opening a particular view, or executing a particular command within said second application.

Rather than continuously updating the model 100, the model updater 200 might be operable to update the model 100 in response to particular stimuli. For example, the model updater 200 might be operable to update the model 100 when an action 515 associated with the second application 510 occurs. For example, when the second application 510 is opened or maximised, or the user switches from the first application 500 to the second application 510, the model updater 200 might update the model 100 to associate that application action with part of the text 501 which had been monitored in the first application 500, for example, a particular text term or sequence of terms.

Figure 2C:
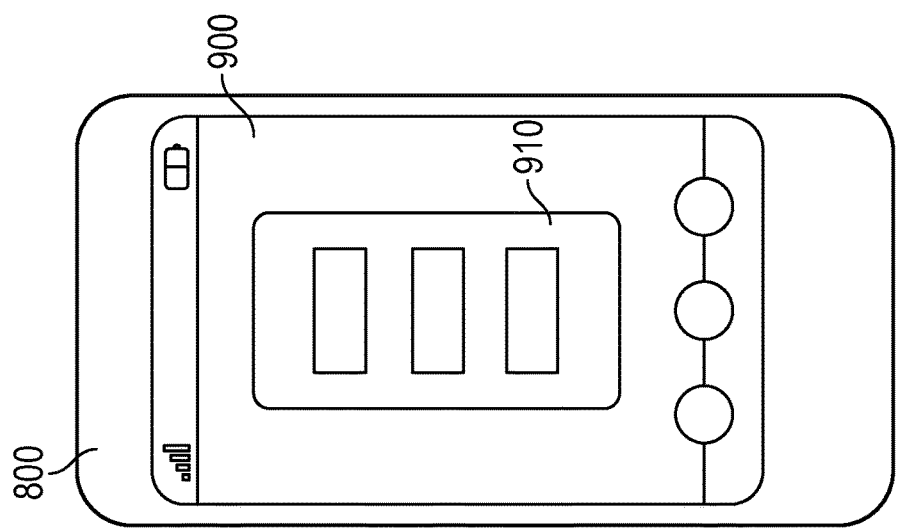
FIGS. 2A, 2B, and 2C are example views of a handheld computing device utilizing a system according to the present invention.
Figure 2B:
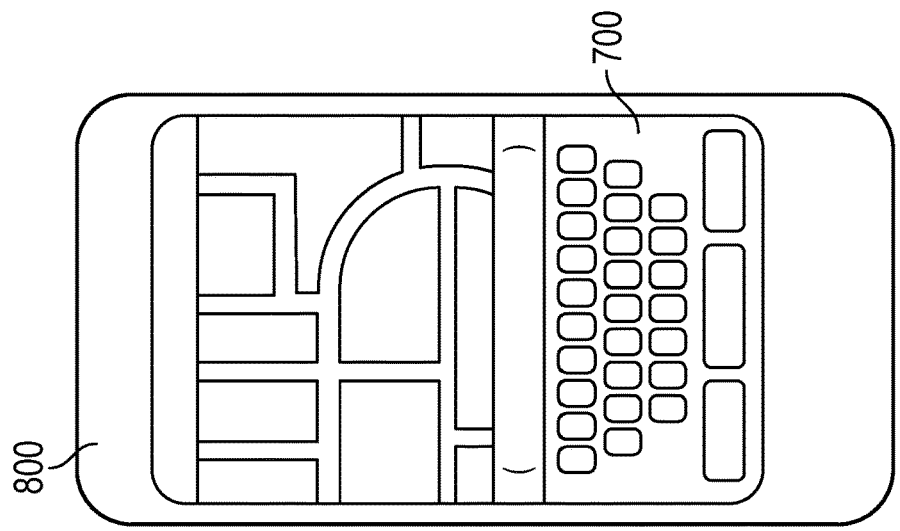
Figure 2A:
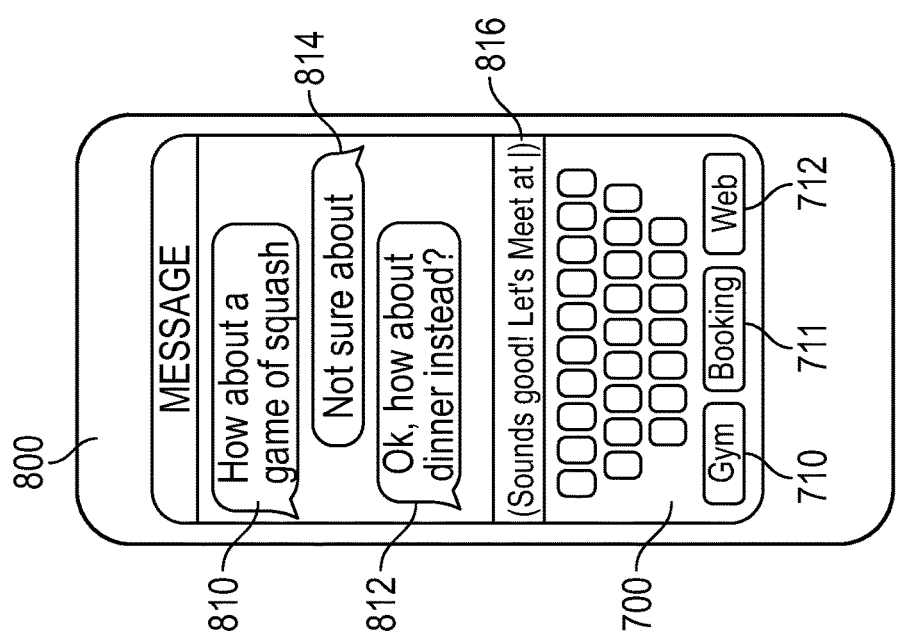

In certain embodiments the system may further comprise a universal keyboard 700, as shown in FIGS. 2A and 2B. By universal keyboard, it is meant that the keyboard is displayed in more than one application of the plurality of applications, for example, it might be displayed in the first application 500 when the first application 500 is active, and also displayed in the second application 510 when the second application 510 is active. The universal keyboard 700 may be implemented as a part of the operating system of the device, a third-party plug-in or extension to the operating system, or as a third-party plug-in or extension to each of the applications in the plurality of applications.

The model updater 200 might be configured to monitor the application actions 505, 515, 525 through the universal keyboard 700. That is to say, if the universal keyboard 700 is active in a first application 500 and the universal keyboard 700 is closed, the model updater 200 can infer that the action of the first application 500 being closed or minimised has occurred. Similarly, if the universal keyboard 700 is opened and is active in the second application 510, then the model updater can infer that the action of the second application 510 being opened or maximised has occurred.

The predictor 300 may be configured to cause the predicted action to be carried out on the device automatically.

The predictor 300 may alternatively be configured to present one or more predicted actions to a user, for example by way of a particular user interface element, displayed as part of or in conjunction with the first application 500. This may continually display one or more predicted actions which the predictor 300 predicts to be most likely based on the model 100 and text 501 within the first application 500. The user can then choose to select a predicted action.

The predictor 300 may be configured to present the prediction to the user as a user interface element 710, 711, 712 on the universal keyboard 700, as shown in FIGS. 2A and 2B.

Additionally or alternatively, the predictor may be configured to present the prediction to the user through a user interface element 910 on a home screen of the system as shown in FIG. 2C, a notification or alert of the system, an overlay user interface element (for example a Facebook 'chat head' icon), a digital personal assistant, and/or a user interface element within the first application 500. The predictor may be configured to modify a pre-existing user interface element, for example to re-order a list of applications on the home screen or applications menu.

The predictor 300 might be configured to present predictions to the user in response to particular prediction display triggers. That is to say, rather than predictions being continually presented to the user, they may be presented to the user only when a particular trigger event occurs.

As indicated by arrow 432 in FIG. 1 the prediction display trigger may comprise an action 505 associated with the first application 500. For example, if the action of closing or minimising the first application 500 is detected, then this might trigger the predictor 300 to present a prediction of one or more actions for another application of the plurality of applications. Additionally or alternatively, the prediction display trigger might be an application program interface request from the system or from another application of the plurality of applications, or may comprise an internal event within one of the applications, for example a message being received in an application, optionally from a particular contact.

Additionally or alternatively, as indicated by dotted arrow 431 in FIG. 1, the prediction display trigger may comprise text 501 monitored within the first application 500. This text may be different from that used by the model updater 200 to update the model 100, although it could be the same text. The prediction display trigger text may comprise text which indicates that a user is likely to wish to perform an application action, for example the text may comprise particular punctuation or text term(s).

Additionally, the predictor 300 might be configured to take into account the time elapsed between the monitoring of the text which is used to make the prediction 420 and the monitoring of the prediction display trigger 431,432 (e.g. receipt of a message in the first application, an action such as closing or minimising the first application, or the user inputting a full stop, etc.). The predictor 300 might be configured such that a prediction is only presented if the prediction display trigger 431,432 occurs within a predefined time period of the occurrence of the text which is used to make the prediction 420. Additionally or alternatively, the predictor 300 might be configured to alter the predicted relevance of a predicted action, depending on the time elapsed between the occurrence of the text used to generate the prediction 420 of that action (i.e. the text which is associated with that action through the model 100) and the occurrence of the prediction display trigger 431,432.

Of course, it is possible that more than one prediction might be generated simultaneously. For example a number of different text terms and/or different sequences of text terms 420 might be used by the predictor 300 to generate respective predictions of actions. Where the predictor 300 is additionally configured to take into account the time elapsed between the occurrence of the text used to generate the prediction 420 and the occurrence of the prediction display trigger 431,432, then the predictor might adjust the relative likelihood of the respective predicted actions depending on the time elapsed between the prediction display trigger 431, 432, and the occurrence of the particular text associated with that particular application action (through the model 100).

The predictor 300 might be configured to display only the most relevant predicted action.

Alternatively, the predictor 300 might be configured to display more than one predicted action but give more prominence to more likely actions. For example, where the predicted actions are displayed in a list, the list might be ordered according to the likelihood of the predicted actions. Additionally or alternatively, the predictor 300 may be configured to give prominence to predicted actions with greater likelihood by way of the position or size of the graphical user interface elements by which the user might select said predicted actions.

Furthermore, where the predictor 300 is configured to present one or more predicted actions to the user for selection, the model updater 200 might be configured to update the associations in a model based on whether a user selects a particular predicted action. For example, where a predicted action is generated by the predictor 300 based on particular text used to generate the prediction 420 and presented to the user, if the user subsequently selects that predicted action, the model updater 200 might update the model 100 to strengthen the association between that particular text and the particular action. If the user ignores the predicted action and goes on to perform a different application action (either through selecting an alternative presented action, or an action which was not predicted, monitored as described above), the model updater 200 might update the model 100 to weaken the association between that particular text and the action which had been predicted and/or updating the model 100 by strengthening the association between the particular text and the application action which the user did perform. Of course, if the user performs an action which was not predicted, the model updater may, as described above, update the model to create an association between that action and text 501 within the first application 500.

The model 100 might be configured such that contextual data 600 is also associated with the actions which might be predicted. As indicated by arrow 440, the model updater 200 might be configured update the model 100 based on contextual data 440 and the text used to update the model 401. As indicated by arrow 441, the predictor 300 might then generate predictions based, not only on the text used to generate the predictions 420, but also based on contextual data.

In this context, the term contextual data refers to data which might be provided by the device, system or applications.

The contextual data might be active application data; namely, an application which is currently active or has been recently active on the device. The model 100 might associate a particular action with particular text where a particular application is active or has been recently active on the device. The predictor 300 might then generate predictions based, not only on text 420 but also taking into account the application which is currently active or has most recently been active.

By way of further example, the contextual data might be time or location data (e.g. GPS location data) retrieved from the operating system of the device. The model 100 might associate a particular action with particular text at a particular time or location. The predictor 300 might then generate predictions based, not only on text 420, but also taking into account the current time or current location of the device at the time of generating the prediction, or the current time or current location of the device at the time at which the text 420 is monitored.

The model 100 might undergo a pre-initialisation (static) training phase, before it undergoes dynamic training on a user's device, as described above. That is to say, the model 100 may be initialised on the device already having associations between particular text or text terms and particular application actions. This may have been amassed by many users and used to pre-train the model on a remote server.

The model 100 might take the form of any of a number of linguistic models.

For example, in one embodiment, the model 100 might be a naïve Bayes classifier.

Naïve Bayes classifiers are a family of probabilistic classifiers based on the Bayes' theorem used to classify data. Conditional on a specific class, features are assumed to be independent. For example a fruit may be considered to be an apple if it is red, round, and about 6 cm in diameter. A naive Bayes classifier considers each of these features to contribute independently to the probability that this fruit will be classified as an apple, regardless of any possible correlations between the colour, shape and diameter features.

By way of example in relation to the present invention, model 100 might be a Naïve Bayes classifier which is trained by the model updater 200 so as to associate or map application actions with certain words.

The model 100 may consist of text terms or words associated with or mapped to application actions using a score. FIG. 4 shows a simple example of training process (i.e. updating of the model 100) using the words "where", "play", "when" and the application actions of opening Google Maps, Google Calendar and YouTube. The score signifies the relevance of the mapping and is used by the predictor 300 to make the prediction. During dynamic training, the model updater 200 may update the scores based on the occurrence of application actions (i.e. opening of a particular application) when particular text terms are monitored.

As described above, a static data set may be used to initially train the model so relevant predictions are made when it is first used (i.e. before it has been updated by the model updater 200 on the device). FIG. 4 shows the initial training data used to initialize the model.

In this example, the user uses the application for the first time by typing the word "where", and subsequently opening Google maps. This text, and the application action of opening Google maps is monitored, and the model updater 200 updates the model 100 to strengthen the association, as shown in FIG. 4 where the count is incremented and the score is re-calculated. The increased score increases the probability of Google maps being predicted by the predictor 300 when basing a prediction on text including the word "where".

FIG. 4 shows the counts and scores after many uses. In this example the user has a history of opening Google Calendar when typing "when" and YouTube when typing the word "play".

As described above, the model 100 might be further configured to associate contextual data with particular application actions in addition to particular text terms. This may be implemented by creating additional pairings between the words and applications, (effectively adding rows containing the words and applications to the tables shown in FIG. 4). This contextual data may be, as in this example, the time of day as provided by the operating system of the device. An example of the dynamic training of the naive Bayes classifier using this example is described using two implementations respectively illustrated by FIGS. 5a and 5b.

In this example, when receiving a message before 15:00, the action of opening the Subway application is frequently monitored whereas after 19:00, the action of opening the Michelin application is frequently monitored. The model updater 200 updates the model 100 with this time data, as well as text data.

In the example shown in FIG. 5A the associations between the time data and the application actions and the associations between the text terms and the application actions are recorded in the model 100 separately. The "Application Counts" table records the total number of times each of the applications has been opened. The "Application Word Counts" records the number of times each application has been opened after a particular term (in this case the term "meal") has been recently monitored. The "Application Time Counts" table records the number of times that action of opening each of the applications has been monitored at particular times of day (in this case the time periods of before 15:00, and after 19:00), which is assumed to be independent of the recently monitored text.

To generate a prediction, the predictor 300, at the time of generating the prediction, combines these data to generate a prediction. The overall (unnormalized) probability based on the word "meal" and the time period is shown in the "Unnormalized probabilities" table. The calculation is based on the product of three components: the base probability of a given application, p(app), which is the count for a particular application divided by the total number of application actions recorded; the word contribution, p(word|app), which is the count for a particular application given a particular word divided by the total number of occurrences of that application; and the time contribution, p(time|app), which is the count for a particular application given a particular time period divided by the total number of occurrences of that application. The unnormalized probability for a particular application action given a particular time and a particular word is given by:

p(app)*p(word|app)*p(time|app).

For example, the probability that the 'Michelin' application will be predicted based on the word 'meal' and a time after 19:00 will be given by:

p('Michelin')*p('meal'|'Michelin')*p(>19:00|'Michelin')=(10/30)*(5/10)*(4/10)=0.067

Alternatively, as shown in FIG. 5B, the model might be configured such that the application actions are associated with combined text and time data. In this case, the unnormalized probability for a given by:

p(app)*p(word+time|app)

For example, the probability that the 'Michelin' application will be predicted based on the word 'meal' and a time after 19:00 will be given by:

p('Michelin')*p('meal'+>19:00|'Michelin')=(10/30)*(4/10)=0.067

By way of further example, in another embodiment, the model 100 might be a neural network. By way of further, specific, example, the model 100 might be a deep neural network composed of multiple node layers.

During training, applications are mapped to text by creating correlation vectors. Deep neural networks require numerical vectors as inputs. Therefore, before training can take place, text must first be translated into vectors, a process known as word embedding.

This can be achieved using word embeddings generated from a database model. Such a model receives a text corpus and maps each word to a multi-dimensional numerical vector. Similar words (synonyms) are grouped together by mapping them to similar vectors i.e. similar words are close together in vector space.

These vectors are used in the static and dynamic training of the model to create correlation vectors between synonyms and a single application. This can enable the model to accurately predict an application the first time a word is used. For example, the model may have learnt to associate a map application with the word "location" when the user opened a map application after typing or receiving the word "location". Since "location" and "place" have similar word vectors, when the user types "place" for the first time, a map application is predicted.

Figure 6:
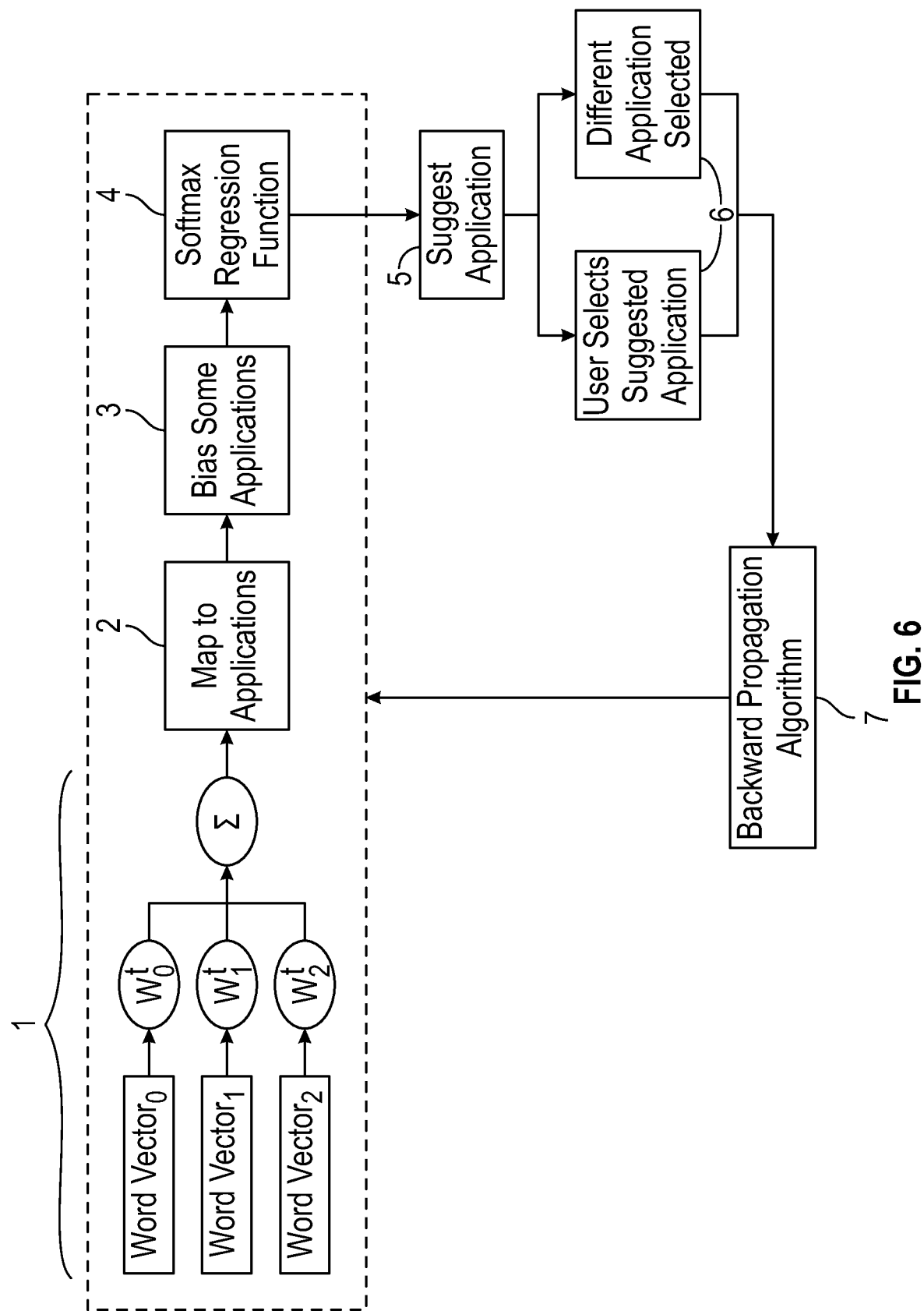
FIG. 6 shows a flow diagram of an exemplary neural network based model.

A flow diagram showing an exemplary neural network which may be used by the predictor 300 to generate predictions of application actions is shown in FIG. 6, and described below.

At step (1), word vectors corresponding to on screen text are weighted and summed. Weight values (w) are determined by the iterative flow of training data through the network. The superscript, 't' denotes that, when a prediction is made by predictor 300, using the model, the value of the weights may depend on the time elapsed between the occurrence of the word being displayed or entered and the time at which the prediction presentation trigger occurs, in accordance with the presentation trigger mechanism described above.

At step (2), the summed output is mapped against possible applications. The mapping may be implemented through multiplication by a weighted matrix wherein the weights are also dynamically learned.

At step (3), popular or favourite applications may then be prioritised.

At step (4), a softmax regression function is applied to generate a list of probabilities for each possible application.

At step (5) one or more predictions, of actions associated with one or more applications, with the highest probability is presented by the predictor 300 to the user.

At steps (6) and (7), the model updater 200 can update associations where the user selects a different application action from those suggested. For example if the user opens a different application, a backward propagation algorithm can calculate an error from the predicted application and the open application using a negative log-likelihood function. The error is fed back to the neural network to adjust the weights and application biases. If the user opens the predicted application, the backward propagation algorithm reinforces the values of the weights and application biases.

In another embodiment, the model may be an n-gram language model which associates words or sequences of words with application actions. The application actions may be associated with the n-gram sequences such that they may be predicted in response to a particular word or particular sequence of words input by the user or otherwise monitored within a first application.

Figure 3:
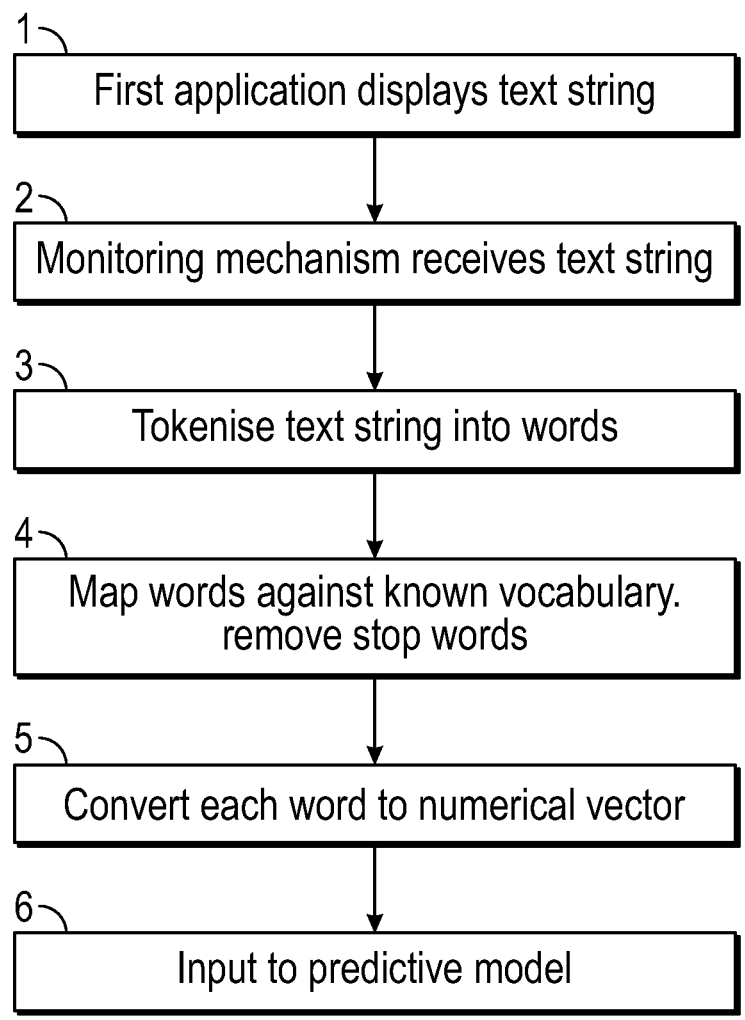
FIG. 3 is a flow diagram illustrating extracting an processing text displayed within an application.

Before the model updater 200 can update the model 100 with text, it is monitored within the first application. This will now be described with reference to FIG. 3.

In step (1), the first application displays text (comprising letters, numbers, spaces, punctuation, symbols, diacritics, and emoji) either typed by the user, received by the first application or otherwise displayed within the first application.

In step (2) the text is monitored by a monitoring mechanism. This may take the form of the operating system's screen reader application program interface (API), an API request to the first application, a plug-in or extension to the first application or to the operating system, or may be user input text monitored through a universal keyboard.

In step (3) the text string retrieved from the first application via the monitoring mechanism is divided into characters, word segments, words, phrases, or otherwise tokenised for further processing. At this stage, punctuation and numbers may be removed.

In step (4) the tokenised words are mapped against a known vocabulary and unimportant words are removed. These may be stop words such as "and", "the", or "e.g.".

In step (5) the remaining tokenised words are each converted into a numerical vector which may, at step (6), be used by the model updater to update the model or by the predictor for basing a prediction upon.

Figure 7:
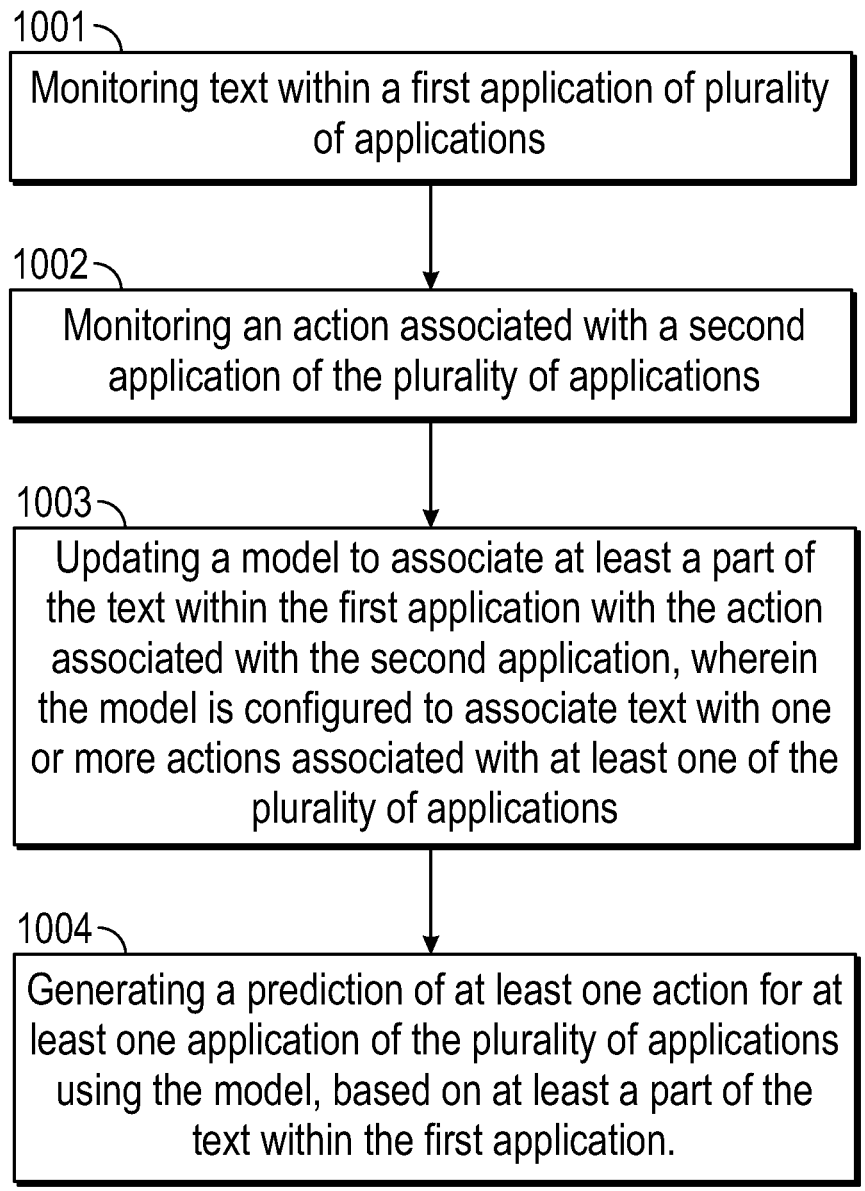
FIG. 7 shows a flow diagram of a method of the present invention.

A method of the present invention is disclosed with reference to FIG. 7.

At step 1001, text is monitored within a first application of a plurality of applications.

At step 1002, an action associated with a second application of the plurality of applications is monitored.

At step 1003 a model is updated to associate at least a part of the text within the first application with the action associated with the second application, wherein the model is configured to associate text with one or more actions associated with at least one of the plurality of applications.

A step 1004, a prediction is generated of at least one action for at least one application of the plurality of applications using the model, based on at least a part of the text within the first application.

The advantages of the system and method described above will further be made apparent by way of the following description of an exemplary use of the system and method.

As shown in FIG. 2A, a messaging application is active on a device 800. An implementation of the system of the present invention is operable on the device 800. The text displayed within the messaging application, comprising the messages in a message thread displayed in the application and the text as it is input by the user into the application, is monitored by a monitoring mechanism (not shown), for example a screen reader API provided by the operating system. The monitoring mechanism may be used by the model updater to monitor text which is associated with an application action, and/or by the predictor to monitor text within an active application in order to generate a prediction of an application action.

This monitored text comprises two particular terms which are associated with application actions in the model 100. The message 810 "How about a game of squash later?" includes the term "squash" which is, in model 100, associated with the action of opening a gym facility booking application. The message 812 "Ok, how about dinner instead?" includes the term "dinner" which is, in model 100, associated with the action of opening a restaurant booking application and with the action of opening a web browser and opening a view of a restaurant review website within the web browser.

The predictor might be configured to continually present generated predictions to the user, that is to say, universal keyboard 700 might comprise a graphical user interface area which continually displays predictions generated by the predictor 300. In this case, however, the predictor presents the predictions in response to a prediction presentation trigger. In this case, the presentation trigger is a particular text term in the monitored text. In this case, the word "meet" is monitored in the user input area 816. In response to this trigger, the predictor 300, generates predictions of the above-mentioned three actions based on the model 100 and the text monitored in the messaging application and presents the actions (e.g. the action of opening the gym booking application, opening the restaurant booking application or opening the web browser application and then opening a view of the restaurant review website) to the user as selectable graphical user interface elements 710, 711, 712 of the universal keyboard 700.

The predictor 300 predicts the relevance of each of the predicted application actions in the manner described above. Since the model has a stronger association between the work "dinner" and the action of opening the restaurant booking application (compared to the restaurant review website), this action is predicted to be more relevant. The predictor 300 also bases its predictions on the amount of time elapsed between the occurrence of the text term associated with an application action, and the occurrence of the prediction presentation trigger. In this case, as less time has elapsed between the occurrence of the term "dinner" and the trigger, as compared to the term "squash", the predictor 300 predicts that actions associated with this term will have greater relevance. As shown in FIG. 2A, a result of this greater predicted relevance may be that the graphical user interface element 711 associated with that prediction is larger than the graphical user interface elements 710, 712. Alternatively or additionally, in one embodiment, the predicted actions may be ordered in terms of relevance, for example, the most relevant action may be the left most or central graphical user interface element.

The user might then select one of the predicted actions, and the monitoring of the application action of, say, opening the restaurant booking application may be monitored through the selection of this graphical user interface element. As described above, the model updater 200 may then update the model to strengthen the association between that action and particular term on which the prediction was based.

Alternatively, as shown in FIG. 2B, the user may choose not to select any of the predicted application actions, but instead open a mapping application. As described above, this application action may be monitored through the universal keyboard 700, which is activated and displayed at the same time as the map application. Because of this, the universal keyboard 700 is able to infer that the user has selected the action of opening the map application, and thus the model updater 200 can update the model 100 to associate the text monitored within the messaging application with the action of opening the map application.

Additionally or alternatively to presenting the predictions as part of the universal keyboard 700, the predictions might be presented on a graphical user interface element 910 on a homescreen 900 of the device 800, as shown in FIG. 2C. In this case, it might be that the application action of closing the messaging application triggers the presentation of the predictions.

The present invention also provides a computer program, or a computer program product comprising a computer readable medium having stored thereon computer program means, for causing one or more processors to carry the method according to the present invention.

The computer program product may be a data carrier having stored thereon computer program means for causing a processor external to the data carrier, i.e. one or more a processor of a computer system, to carry out the method according to the present invention. The computer program may be available for download, for example from a data carrier or from a supplier over the internet or other available network, e.g. downloaded as an app onto a mobile device (such as a mobile phone) or downloaded onto a computer, the mobile device or computer comprising one or more processor for executing the computer program means once downloaded.

The system of the present invention may be provided in a single electronic device, e.g. a mobile, tablet, PC, etc. Alternatively, it may be provided as a distributive system, where one or more of the model, the model updater, the predictor, and one or more of the applications are provided in the cloud or on a remote server, whilst one or more of the model, the model updater, the predictor, one or more of the applications, and optionally the universal keyboard, are provided on a user's device.

It will of course be understood that the embodiments of the present invention have been described above purely by way of example and modifications of detail can be made within the scope of the invention.

The invention claimed is:

1. A method for generating an action prediction, the method comprising:
monitoring text received within a first application;
monitoring a user action associated with a second application, wherein the second application is different from the first application;
associating a part of the received text with the monitored user action;
based on the associated part of the received text, generating a prediction of a user action for a third application, wherein the third application is different from the first application; and
presenting the predicted user action to a user for selection.

2. The method of claim 1, wherein the monitored text is at least one of text displayed on a screen of the first application, text received by the first application, or text input by the user into the first application.

3. The method of claim 2, further comprising:
prior to associating the part of the received text with the monitored user action, filtering the received text to remove punctuation or particular words.

4. The method of claim 3, wherein the filtering of the monitored text comprises removing sections of text which have already been used for associating with the monitored user action.

5. The method of claim 1, wherein the monitored user action includes at least one of closing the first application, opening the second application, maximizing the second application, switching from the first application to the second application, performing an internal action in the second application, or opening a specific view in the second application.

6. The method of claim 1, wherein the generated prediction is presented to the user through any one of:
a user interface screen;
a notification or alert presented to the user;
a digital personal assistant; or
a user interface element within the first application.

7. The method of claim 1, wherein the predicted user action comprises one or more of opening an application, installing an application, maximizing an application, recommending an application to be installed, or opening a view providing information about an application.

8. The method of claim 1, further comprising:
receiving selection of the predicted user action;
learning likely user action selections based on the received selection; and
dynamically refining, based on the learned user action selections, the generation of the predictions of the user actions.

9. The method of claim 1, wherein, instead of generating a prediction of a user action for the third application, the method comprises generating a prediction of a user action for the second application.

10. A system for generating an action prediction, comprising:
a processor; and
a computer-readable medium including computer program instructions, which when executed by the processor, causes the processor to:
monitor text received within a first application;
monitor a user action associated with a second application, wherein the second application is different from the first application;
associate a part of the received text with the monitored user action;
based on the associated part of the received text, generate a prediction of a user action for a third application, wherein the third application is different from the first application; and
present the predicted user action to a user for selection.

11. The system of claim 10, wherein the monitored text is at least one of text displayed on a screen of the first application, text received by the first application, or text input by the user into the first application.

12. The system of claim 11, wherein the processor is further configured to:
prior to associating the part of the received text with the monitored user action, filter the received text to remove punctuation or particular words.

13. The system of claim 12, wherein the filtering of the monitored text comprises removing sections of text which have already been used for associating with the monitored user action.

14. The system of claim 10, wherein the monitored user action includes at least one of closing the first application, opening the second application, maximizing the second application, switching from the first application to the second application, performing an internal action in the second application, or opening a specific view in the second application.

15. The system of claim 10, wherein the predicted user action comprises one or more of opening an application, installing an application, maximizing an application, recommending an application to be installed, or opening a view providing information about an application.

16. A computer readable storage medium including computer program instructions, which when executed by a processor, perform the steps for generating an action prediction, comprising:
monitoring text associated with a first application;
monitoring a user action associated with a second application, wherein the second application is different from the first application;
associating a part of the received text with the monitored user action;
based on the associated part of the received text, generating a prediction of a user action for a third application, wherein the third application is different from the first application; and
presenting the predicted user action to a user for selection.

17. The storage medium of claim 16, wherein the monitored text is at least one of text displayed on a screen of the first application, text received by the first application, or text input by the user into the first application.

18. The storage medium of claim 17, wherein the monitored user action includes at least one of closing the first application, opening the second application, maximizing the second application, switching from the first application to the second application, performing an internal action in the second application, or opening a specific view in the second application.

19. The storage medium of claim 17, wherein the predicted user action comprises one or more of opening an application, installing an application, maximizing an application, recommending an application to be installed, or opening a view providing information about an application.

20. The storage medium of claim 17, wherein the steps further comprise:
receiving selection of the predicted user action;
learning likely user action selections based on the received selection; and
dynamically refining, based on the learned likely user action selections, the generation of the predictions of the user actions.

* * * * *